United States Patent
Zapata

(10) Patent No.: US 12,434,834 B2
(45) Date of Patent: Oct. 7, 2025

(54) HYBRID FLYING DEVICE

(71) Applicant: ZIPAIR, Chateauneuf-les-Martigues (FR)

(72) Inventor: Frankie Zapata, Le Rove (FR)

(73) Assignee: ZIPAIR, Chateauneuf-les-Martigues (FR)

( * ) Notice: Subject to any disclaimer, the term of this patent is extended or adjusted under 35 U.S.C. 154(b) by 0 days.

(21) Appl. No.: 18/701,755

(22) PCT Filed: Jul. 21, 2022

(86) PCT No.: PCT/FR2022/051459
§ 371 (c)(1),
(2) Date: Apr. 16, 2024

(87) PCT Pub. No.: WO2023/067253
PCT Pub. Date: Apr. 27, 2023

(65) Prior Publication Data
US 2025/0136287 A1    May 1, 2025

(30) Foreign Application Priority Data

Oct. 20, 2021  (FR) ........................................ 2111127

(51) Int. Cl.
  *B64C 29/00*  (2006.01)
  *B64D 27/33*  (2024.01)
  *B64D 27/357*  (2024.01)

(52) U.S. Cl.
  CPC .......... *B64C 29/0083* (2013.01); *B64D 27/33* (2024.01); *B64D 27/357* (2024.01)

(58) Field of Classification Search
  CPC .... B64D 27/33; B64D 27/357; B64D 27/359; B64D 31/18; B64D 35/022; B64C 29/0083
  See application file for complete search history.

(56) References Cited

U.S. PATENT DOCUMENTS 11,772,788 B1 * 10/2023 Waltrich ................. B60L 15/02
                                                          244/17.23
2016/0009404 A1 * 1/2016 Newman ................ B64D 31/00
                                                              701/3
(Continued)

FOREIGN PATENT DOCUMENTS

CN        107628241 A       1/2018
CN        207120892 U       3/2018
(Continued)

OTHER PUBLICATIONS

International Search-Report (PCT/ISA/210) with translation and Written Opinion (PCT/ISA/237) mailed on Oct. 6, 2022, by the European Patent Office as the International Searching Authority for International Application No. PCT/FR2022/051459. (16 pages).

*Primary Examiner* — Rodney A Bonnette
(74) *Attorney, Agent, or Firm* — BUCHANAN, INGERSOLL & ROONEY PC

(57) ABSTRACT

A flying device includes a main body, to which a combustion engine, an electric motor, an electricity generator and an electrical energy transfer circuit are attached. The combustion engine and electric motor are arranged to create thrust vectors and are placed on either side of the main body in order to create thrust vectors on each side of a plane of separation of said body. The electricity generator is mechanically coupled to the combustion engine in order to be driven thereby. The electrical energy transfer circuit is connected between the electricity generator and the electric motor, the energy transfer circuit being configured to create mechanical resistance that slows the combustion engine and to produce electrical energy in order to power the electric motor.

11 Claims, 5 Drawing Sheets

(56) References Cited

U.S. PATENT DOCUMENTS

| | | | |
|---|---|---|---|
| 2016/0207625 A1* | 7/2016 | Judas | B64U 10/20 |
| 2018/0178921 A1 | 6/2018 | Bak et al. | |
| 2018/0297683 A1* | 10/2018 | Armstrong | B63H 23/02 |
| 2018/0346136 A1* | 12/2018 | Arkus | B64D 35/023 |
| 2019/0329897 A1 | 10/2019 | Armstrong et al. | |
| 2021/0387723 A1 | 12/2021 | Moon et al. | |
| 2022/0024586 A1 | 1/2022 | Zapata | |

FOREIGN PATENT DOCUMENTS

| | | |
|---|---|---|
| CN | 109263878 A | 1/2019 |
| WO | 2017174942 A1 | 10/2017 |
| WO | 2020096254 A1 | 5/2020 |

* cited by examiner

HYBRID FLYING DEVICE

The present invention relates to the field of hybrid flying devices that make it possible to lift and transport a payload, the latter being able to consist of a passenger and/or goods. The invention relates in particular to a vertical take-off and landing device combining at least one combustion engine and at least one electric motor.

Moving as freely as possible in space is an unchanging human preoccupation, or for some an almost unachievable dream. Many machines have been designed, from the most basic to the most sophisticated. Among these machines there are vertical landing and take-off flying devices that have the advantage of needing a take-off or landing surface of reduced size.

Helicopters are the most used vertical take-off and landing aircraft. A helicopter uses at least one combustion engine connected to a variable-pitch rotor which makes it possible to tilt the helicopter and thus to direct the vertical thrust of the engine towards the back, the front or on one of the sides. It is also known to have planes with engines which can tilt in order to be able to provide a vertical or horizontal thrust. These aircraft are relatively complex to make and to manoeuvre, and cannot become widespread for urban transport.

There are also drones which have a body equipped with 2 to 12 arms distributed around said body. Each arm is equipped with an electric motor and provides a vertical thrust. As the motors are distributed all the way around the body, a control of the thrust of each motor makes it possible to tilt the body of the drone and to control the direction of said drone. These drones are very easy to handle by exploiting the thrust exerted by each motor, but they require a battery to be carried. The battery is generally dimensioned as a function of the weight of the drone, its payload and the desired range. The use of such drones with large payloads requires the use of a battery with a large size, which adds a considerable weight to the drone, even greater than its payload, in particular if it is desired to have a range of several tens of kilometres. The use of this type of drone is limited to a payload of the order of 10 kilograms with a range of the order of 10 kilometres.

Combustion engines are known for using a liquid, solid or gaseous fuel, the weight of which is considerably lower than that of a battery for producing the same amount of energy. The use of a combustion engine on a vertical take-off and landing flying device architecture is of interest for the transport of a heavy load or a person in an urban area and/or over a long distance. However, combustion engines all have a large inertia for changing engine speed in order to increase or decrease a thrust. Thus, the use of combustion engines on a flying device of the drone type causes a loss of handling ability compared with electric motors.

It is also known to use electric motors and combustion engines jointly in order to be able to benefit from the flexibility of use of electric motors. By way of example, the document WO 2017/174942 A1 discloses a flying device that combines combustion engines for ensuring the lift and displacement of the flying device and electric motors placed at the front and the back for controlling the attitude of the flying device. However, a battery has to be dimensioned in order to be able to carry out all flight manoeuvres with a safety minimum, which involves an oversizing of the battery and therefore an excess weight, which will increase the fuel consumption of the combustion engines.

Thus, in order to face up to the current revolution in urban air mobility and to applications with respect to moving passengers or goods calling for a range of several tens of kilometres, in particular for intercity travel, such flying devices, with hybrid airflow, require improvement. It is important to succeed in controlling the energy flows so as to optimize the needs without having to add means for storing electrical energy, which can make said flying device heavier and more complex.

To this end, the invention proposes improving and/or optimizing the energy management of a flying device, in particular with vertical propulsion, arranged to convey a large payload in the air over a long distance. Thus, the present invention aims to overcome the above-mentioned drawbacks, in particular by proposing a propulsion device combining at least one combustion engine with at least one electric motor in order to benefit from the flexibility of an electric motor without having to use a battery with a large size.

For this purpose, the invention proposes a flying device having a main body on which a first combustion engine and a first electric motor are fixed, said first combustion engine and electric motor being arranged to create thrust vectors in one and the same thrust direction and being placed on either side of the main body in order to create thrust vectors on each side of a separation plane passing through a centre of gravity of said body so as to control the attitude of the flying device. The flying device moreover has a first electric generator and a first energy transfer circuit. The first electric generator is mechanically coupled to the first combustion engine in order to be driven by the latter. The first electrical energy transfer circuit is connected between the first electric generator and the first electric motor, the first energy transfer circuit being configured to create a mechanical resistance that slows down the first combustion engine and to produce electrical energy in order to power the first electric motor.

As the powering of the electric motor is thus effected directly by a combustion engine, it is not necessary to provide for a battery for power supply. Moreover, the electric motor is powered by a generator, which acts as a brake on the combustion engine while being placed on an opposite side of the body of the flying device, which makes it possible to increase the responsiveness of the combustion engine by braking it while making an acceleration of the electric motor on the opposite side possible. Such a combination makes it possible to increase the attitude change speed of the flying device and therefore to increase its responsiveness and its manoeuvrability.

Preferably, the first transfer circuit can have a first energy converter controlled to apply a load impedance to the first generator and to provide the energy recovered by the load impedance on an output to the first electric motor.

According to an embodiment, the first transfer circuit can have a second energy converter having an energy input connected to the energy output of the first energy converter and to the first electric motor, said second converter transforming the energy received at its input into control signals of the first electric motor.

To compensate for a difference between a current originating from the first generator and to be provided to the first electric motor, the first transfer circuit can also have an electrical energy storage element. The electrical energy storage element is connected for example between the energy output of the first energy converter and earth in order to absorb a surplus of energy not used by the second energy converter and to return this energy if the energy provided by said first converter is not sufficient to power said second converter.

According to a first improvement, the flying device can have a second combustion engine, a second electric motor, a second electric generator and a second electrical energy transfer circuit. Said second combustion engine and electric motor create thrust vectors in the thrust direction and are fixed on either side of the main body in order to create thrust vectors on each side of the separation plane passing through the centre of gravity of said body, the second combustion engine being placed on the same side of the separation plane as the first electric motor and the second electric motor being placed on the same side of the separation plane as the first combustion engine. The second electric generator is mechanically coupled to the second combustion engine in order to be driven by the latter. The second electrical energy transfer circuit is connected between the second electric generator and the second electric motor, said second transfer circuit being constituted identically to the first transfer circuit.

Preferably, the storage elements can be high-capacity capacitors.

In order to ensure an optimization of the electrical management, the flying device can have a rechargeable battery connected in parallel to the storage elements of the first and second transfer circuits to recover an excess charge of said storage elements.

Also, the first energy converters can be bidirectional and can power the first and second generators in order to act as starters for the first and second combustion engines. The battery can power said generators in order to start said first and second engines.

In order to increase the tipping thrust of the electric motors, the first and/or second electric motors can be positioned respectively at greater distances from the centre of gravity of the main body of said device than the first and/or second combustion engines.

According to a particular embodiment example, the thrust vectors of the first and second combustion engines and electric motors can be comprised in a first thrust plane. The flying device can moreover have a third combustion engine, a third electric motor, a fourth combustion engine, a fourth electric motor, third and fourth electric generators, and third and fourth electrical energy transfer circuits. Said third combustion engine and electric motor can create thrust vectors in the thrust direction and can be fixed on either side of the main body in order to create thrust vectors on each side of the separation plane passing through the centre of gravity of said body. Said fourth combustion engine and electric motor can create thrust vectors in the thrust direction and can be fixed on either side of the main body in order to create thrust vectors on each side of the separation plane passing through the centre of gravity of said body. The fourth combustion engine is for example placed on the same side of the separation plane as the third electric motor and the fourth electric motor is for example placed on the same side of the separation plane as the third combustion engine. The third and fourth electric generators can be mechanically coupled respectively to the third and fourth combustion engines in order to be driven by these latter. The third and fourth electrical energy transfer circuits can be connected respectively between the third and fourth electric generators and the third and fourth electric motors, said third and fourth transfer circuits being constituted identically to the first transfer circuit. The thrust vectors of the third and fourth combustion engines and electric motors can be comprised in a second thrust plane intersecting the first thrust plane on a crossing axis parallel to the thrust direction.

Preferably, the crossing axis can pass through the centre of gravity of the flying device.

In a particular embodiment, the first to fourth combustion engines and electric motors can be fixed to the main body via four support arms positioned above the centre of gravity of said body and able to be arranged to support the first to fourth combustion engines and electric motors, and integrate the electrical energy storage elements.

In a preferred embodiment, the thrust direction can be vertical.

The invention will be better understood and other features and advantages of it will become apparent on reading the following description of particular embodiments of the invention, provided as illustrative and non-limitative examples, and with reference to the accompanying drawings, in which.

In order to simplify the description, one and the same reference is used in different figures to designate one and the same object or a similar object providing the same function. Thus, when the description mentions an object with a reference, this object will be able to be identified on several figures. Moreover, the figures and the description are given by way of non-limitative embodiment examples.

The description relates to a flying device using fixed motors and having a movement direction which is determined by the tilt of the flying device. In order to simplify the description, the horizontal plane corresponds to the horizontal plane of the device which is horizontal when it is set down on the ground but which follows the attitude of the flying device when it tilts. When reference is made to a vertical thrust of the motors/engines, the verticality is defined vis-à-vis the horizontal plane which follows the attitude of the flying device. Thus, the engines exert a thrust which is always vertical with respect to the horizontal plane of the flying device including when the flying device tilts. However, the invention is not limited to devices the thrust of which is only vertical. In fact, the thrust of the motors/engines could be tilted with respect to the vertical, or even to the horizontal. A person skilled in the art will understand that it is sufficient to carry out a rotation of the assembly as a function of a chosen thrust direction.

The principle implemented by the invention consists of powering an electric propulsion motor located on a first side of a flying device with the aid of a combustion propulsion engine located on a second side of the flying device, opposite the first side. A first embodiment example is represented in FIG. 1 in a side view in order to explain the principle.

Figure 1:
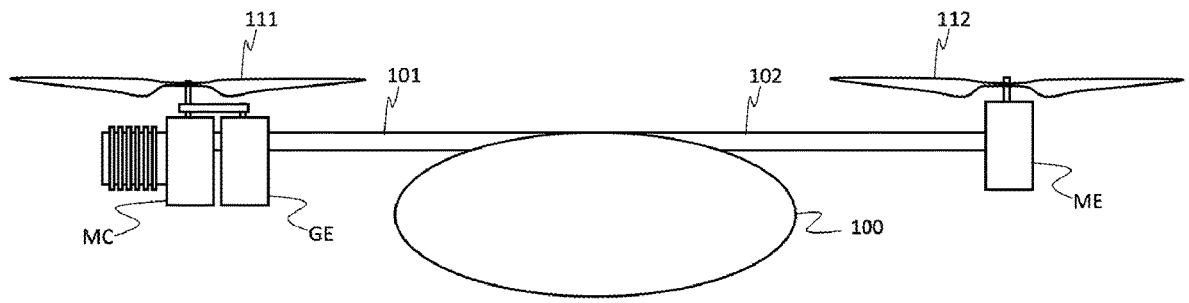
FIG. 1 represents a first example of a flying device according to the invention.

The flying device of FIG. 1 has a main body 100, on which a combustion engine MC and an electric motor ME are fixed. The fixing of the combustion engine MC and electric motor ME can be carried out with the aid of fixing arms 101 and 102 placed on either side of the main body 100. The invention is not limited to the use of arms and can use any other means for fixing the combustion engine MC and electric motor ME, the combustion engine MC and electric motor ME being able to be integrated in a fairing of the main body 100, it being important that the combustion engine MC and electric motor ME are placed on either side of the main body 100 in order to create vertical thrusts on two opposite sides of said body 100. By opposite sides is meant any sides opposite one another, such as for example the left side and the right side or else the front side and the back side or any other configuration.

The combustion engine MC is for example a 2 or 4 stroke piston engine having one or more pistons connected to a crankshaft, which converts an alternating movement of the piston or pistons into a rotational movement. The crankshaft is mechanically connected to a propellor 111, which converts the rotation of the engine into a thrust vector which is substantially vertical with respect to the main body 100. The connection between the propellor 111 and the combustion engine MC can be effected in different ways, either directly by fitting the propellor 111 on the crankshaft of the combustion engine MC or via pinions, a belt or any other speed reducer.

The electric motor ME is also connected to a propellor 112, which converts the rotation of the electric motor ME into a substantially vertical thrust vector. The connection between the propellor 111 and the electric motor ME can be effected in different ways, either directly by fitting the propellor 111 on the rotor of the electric motor ME or via pinions, a belt or any other speed reducer. The electric motor ME can be any type of electric motor, a person skilled in the art being able to adapt the circuits described hereafter to the type of electric motor as a function of the choice made.

The flying device of FIG. 1 moreover has an electric generator GE mechanically coupled to the combustion engine MC in order to be driven by the latter. The electric generator GE is also an electric motor of any type, but which is used as a generator, i.e. to convert the mechanical energy of rotation into electric current. The mechanical coupling between the electric generator GE and the combustion engine can be effected by gears or by belt. It is also possible to couple the electric generator GE directly to the axle of the crankshaft of the combustion engine MC, as long as a flat electric motor, for example of the "pancake" type, is used as electric generator.

Figure 2:
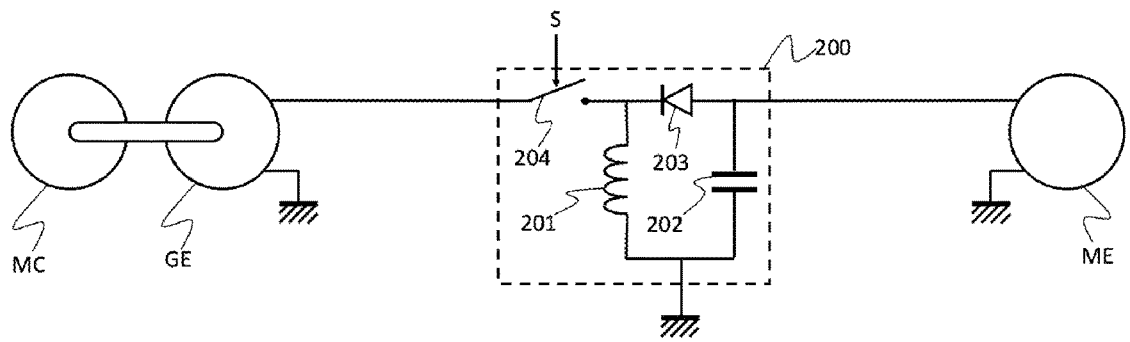
FIG. 2 illustrates a first example of an electric circuit implemented in the flying device of FIG. 1.

According to the invention, the electric motor ME is powered by the electric generator GE via an energy transfer circuit. FIG. 2 illustrates a first example of an electric circuit implemented in the flying device of FIG. 1.

In the example of FIG. 2, the electric generator GE and the electric motor ME are both direct current motors which convert a direct current into a rotation speed and vice versa. A transfer circuit 200 is connected between the electric generator GE and the electric motor ME. By way of example, the transfer circuit 200 can be a chopper, also known as a "buck-boost converter". In the example of FIG. 2, the transfer circuit 200 has an inductor 201 having a terminal connected to a capacitor 202 and another terminal connected to the anode of a diode 203 and to a current output of the electric generator GE via a controlled switch 204. The controlled switch 204 is for example a power transistor. The cathode of the diode is connected to the capacitor 202 and to the current input of the electric motor ME. The electric generator GE, the electric motor ME, and the node between the inductor 201 and the capacitor 202 are connected to a common earth.

By way of example, the operation of the energy transfer circuit 200 will be described in more detail in order to explain the operating principle of the invention. When the switch 204 is closed, the electric generator GE is connected to the inductor 201. The voltage at the terminals of the electric generator GE is proportional to its rotation speed. The current provided by the electric generator GE charges the inductor 201 and increases in the direction of an equilibrium value according to a logarithmic curve. The increase in the current provided by the electric generator GE creates a mechanical resistance on the combustion engine MC which brakes the latter, the braking energy being transmitted to the inductor 201. As the inductor 201 is opposed to an abrupt variation in current, opening the switch 204 causes a reduction of the voltage on the anode of the diode 203 which activates the latter and closes the circuit composed of the inductor 201, the capacitor 202 and the diode 203. As the switch 204 is open, the inductor 201 discharges into the capacitor 202, which sees the voltage at its terminals increase. The voltage increasing at the terminals of the capacitor 202 increases the voltage at the terminals of the electric motor ME and turns said motor ME by taking a part of the current circulating between the inductor 201 and the capacitor 202. When the switch 204 is closed again, the diode 203 blocks, the inductor 201 is recharged by the electric generator GE and the capacitor 202 discharges into the electric motor ME.

Applying a control signal S alternating between opening and closing the switch 204 at a high frequency, for example of a few tens of kilohertz, makes it possible to arrive at a situation of equilibrium in which the generator GE provides a voltage and current variable around an average value proportional to the duty cycle of the control signal S. An equilibrium is also created between the combustion engine MC and the generator GE. In fact, the combustion engine MC has to drive the propellor 111 and the average resistance of the generator GE, which is also proportional to the duty cycle of the control signal S. Thus, a part of the mechanical energy produced by the combustion engine MC is removed by the generator GE in order to be transmitted to the electric motor ME.

If a theoretical case is considered in which the energy conversion losses of the transfer circuit 200 are zero, in which the combustion engine MC provides a constant mechanical energy corresponding to a fixed nominal power, and in which the generator GE and the electric motor ME are identical and capable of providing or receiving an electrical power equal at most to the fixed nominal power, then a duty cycle of 50% of the control signal S makes it possible to transfer 50% of the mechanical energy produced by the combustion engine MC to the electric motor ME, thus making it possible to have a vertical thrust force equivalent to 50% of the energy produced by the combustion engine MC on each side of the main body 100. A reduction of the duty cycle of the control signal S has the effect of reducing the energy transmitted, which makes it possible to slow down the electric motor ME and to reduce the mechanical resistance applied to the combustion engine MC and therefore to increase the speed of the combustion engine MC. Thus, a reduction of the duty cycle of the control signal 200 has the effect of increasing the vertical thrust force produced by the combustion engine MC while reducing the thrust force of the electric motor ME, thus creating a thrust imbalance which tilts the flying device, in FIG. 1, in the clockwise direction. Conversely, an increase of the duty cycle of the control signal S creates a reverse thrust imbalance which tilts the flying device, in FIG. 1, in the anticlockwise direction.

If the losses linked to the mechanical energy transfer are taken into account, the duty cycle of the control signal S must be adjusted accordingly. By way of example, if the losses are of the order of 10%, the duty cycle must correspond to a call for 55% of the energy of the combustion engine MC in order to return only 45% of this energy to the electric motor ME in order to have the same thrust force on each side of the flying device. Differences in power pairing between the combustion engine MC, the generator GE and the electric motor ME can also be compensated for by adjusting the duty cycle.

In terms of responsiveness, such a system is not symmetrical. In fact, the braking of the combustion engine MC is carried out by the generator GE, which acts as an electric brake and therefore more quickly than if a throttle of the combustion engine were reduced. In addition, the braking energy is directly accessible for the electric motor ME, which can accelerate very quickly. Thus, the transfer of thrust towards the electric motor is effected very quickly. Conversely, to accelerate the combustion engine MC, the generator GE reduces the braking force. However, the acceleration of the combustion engine MC happens according to an acceleration curve of said engine MC, which is less responsive than an electric motor. By contrast, the reduction in speed of the electric motor ME remains very quick. The transfer of thrust towards the combustion engine MC is slower than the transfer of thrust towards the electric motor ME while remaining quicker than a transfer of thrust between two combustion engines.

Figure 3:
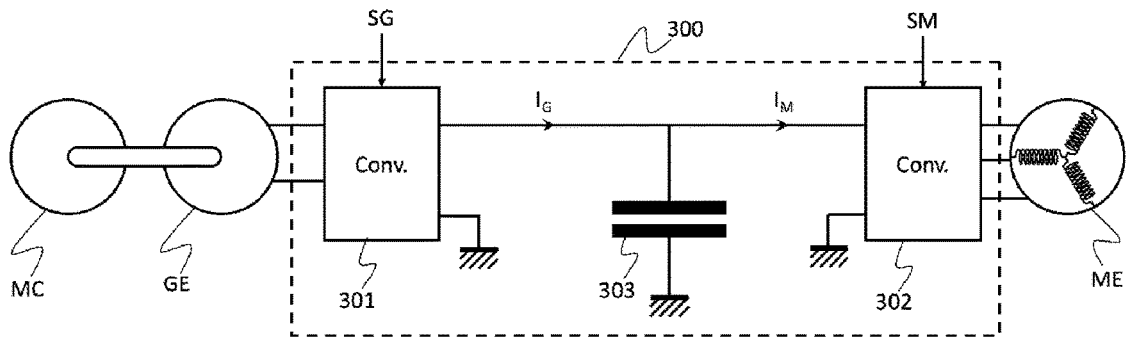
FIG. 3 illustrates a second example of an electric circuit implemented in the flying device of FIG. 1.

To improve the responsiveness, it can be preferable to control the electric generator GE and the electric motor ME independently. Thus, the braking and the acceleration of the combustion engine MC can become independent of the acceleration and the braking of the electric motor ME. FIG. 3 illustrates a second example of an electric circuit implemented in the flying device of FIG. 1 which makes an independent control of the electric generator GE and the electric motor ME possible.

In the example of FIG. 3, the electric generator GE and the electric motor ME can be any type of electric motor, direct current, synchronous or asynchronous alternating current, single-phase or multi-phase, or also of the stepper motor type. The electric generator GE and the electric motor ME can moreover be of two different types but having powers of the same order of magnitude as the power of the combustion engine MC. A transfer circuit 300 is connected between the electric generator GE and the electric motor ME. The transfer circuit 300 mainly has a first energy converter 301, a second energy converter 302 and an electrical energy storage element 303.

The first energy converter 301 has signal inputs connected to the electric generator GE, a current output and a control signal input. The first energy converter 301 is a specific converter adapted to the type of motor used as electric generator GE and has a number of signal inputs adapted to the number of phases of said generator GE for converting a mechanical rotational energy into electric current. The first energy converter 301 applies one or more load impedances to the winding(s) of the generator GE and converts the thus-recovered energy into a current. The current output of the first energy converter 301 provides the current IG proportional to the load impedance and to the rotation speed of the generator GE. The control signal input receives an analogue or digital control signal SG, which controls the load impedance. Indirectly, the control signal SG controls the mechanical resistance applied to the combustion engine MC by the electric generator GE. The first energy converter 301 is of a known type, which will not be described in more detail because a large number of circuits can be used and correspond to the type of motor used.

The second energy converter 302 has signal outputs connected to the electric motor ME, a current input and a control signal input. The second energy converter 302 is a specific converter adapted to the type of motor used as electric motor ME and has a number of signal outputs adapted to the number of phases of said motor ME for converting an electric current into mechanical rotational energy. The second energy converter 302 is of a known type, which will not be described in more detail because a large number of circuits can be used and correspond to the type of motor used. The control signal input receives an analogue or digital control signal SM, which corresponds to a power setpoint to be provided to the electric motor ME via the signal outputs connected to the phases of said motor ME. The current input of the second energy converter 302 is connected to the current output of the first energy converter 301 and calls for a current IM which is converted into control signals of the electric motor ME.

The electrical energy storage element 303 is connected between the current output of the first energy converter 301 and earth. The energy storage circuit receives or provides a current corresponding to the difference between the current IG and the current IM in order to absorb a surplus of energy not used by the second energy converter 302 and to return this energy to the second energy converter 302 when the energy provided by the first converter 301 is not sufficient to power the second converter 302.

The storage element 303 acts as an energy buffer and its storage capacity remains limited. In fact, the currents IG and IM can be substantially equal except during transitory periods corresponding to the accelerations and reductions of the rotation speed of the combustion engine MC and of the electric motor ME. By way of example, the storage element can be a high-capacity capacitor, also called a supercapacitor. The dimensions of the capacity of such a capacitor can be calculated taking into consideration the fact that it has to store enough energy to power the electric motor for a few seconds.

In terms of operation, the control signals SG and SM are decorrelated, yet they have to be determined jointly. Thus, by disregarding the conversion losses, in order to have a distribution of the thrust forces of 50% on either side of the main body 100, the control signal SG must correspond to the application of a load impedance to the generator GE which makes it possible to draw 50% of the mechanical power produced by the combustion engine MC. The control signal SM must correspond to a power control for powering the electric motor ME which also corresponds to a power equal to 50% of the mechanical energy produced by the combustion engine MC. In such a configuration, the currents IG and IM are equal and correspond to the energy transmitted between the combustion engine MC and the electric motor ME. If the energy conversion losses are taken into account, the control signals SG and SM must be adapted in order to draw a greater power from the combustion engine MC compared with the power returned to the electric motor ME.

In order to brake or accelerate the combustion engine MC and electric motor ME, the control signals SG and SM should be acted on in opposite ways, namely the power drawn from the combustion engine MC should be increased and the power returned to the electric motor ME should be decreased, or the power drawn from the combustion engine MC should be decreased and the power returned to the electric motor ME should be increased. As indicated previously, the acceleration of the combustion engine MC is slower than the acceleration of the electric motor ME. In order to compensate for this difference, it is possible to release the braking of the combustion engine more than is necessary in order that it can accelerate more quickly, until it reaches the desired speed. A greater than necessary release of the braking will involve a transfer of energy from the combustion engine MC less than what is necessary for the electric motor ME. The storage element 303 makes it possible to provide the additional energy to the electric motor ME. To this end, it is necessary to have a minimum level of charge in the storage element 303 in order to carry out such a compensation.

The storage element 303 can be recharged during a reverse tipping where the braking of the combustion engine MC can be anticipated slightly on the acceleration of the electric motor ME, thus creating a greater generation of electrical energy than what the electric motor ME absorbs. Another possibility for recharging the storage element 303 can be effected when the forces of the thrust vectors are balanced between the combustion engine MC and the electric motor ME by drawing slightly more power from the engine MC while providing slightly less power to the electric motor ME. Another possibility for recharging can be effected at the level of a control of the attitude of the flying device. As the flying device is subjected to wind, the control of its attitude can consist of accelerating or braking only one out of the combustion engine MC or electric motor ME in order to re-establish the attitude. A braking of the combustion engine MC or of the electric motor ME which is not compensated for by the other out of the electric motor ME or the combustion engine MC also makes it possible to recharge the storage element 303. More generally, the control signals SG and SM must be generated taking into account the level of charge of the storage element 303 in order to recharge it in order that it can provide energy to the electric motor ME when the latter is not able to provide sufficient energy to the electric motor ME.

The flying device of FIG. 1 only has two motors/engines on two opposite sides, it can only control its attitude according to a single axis of rotation. This can be suitable for a flying device which has other motors/engines or balancing means in order to ensure a tipping according to another axis and to ensure an attitude control according to several axes of rotation. By way of example, such a device can be used for example on one of the flying devices disclosed in the patent application WO 2017/174942, but only for attitude control in one direction by placing the combustion engine and electric motor either on the left and right or at the front and back.

Figure 4:
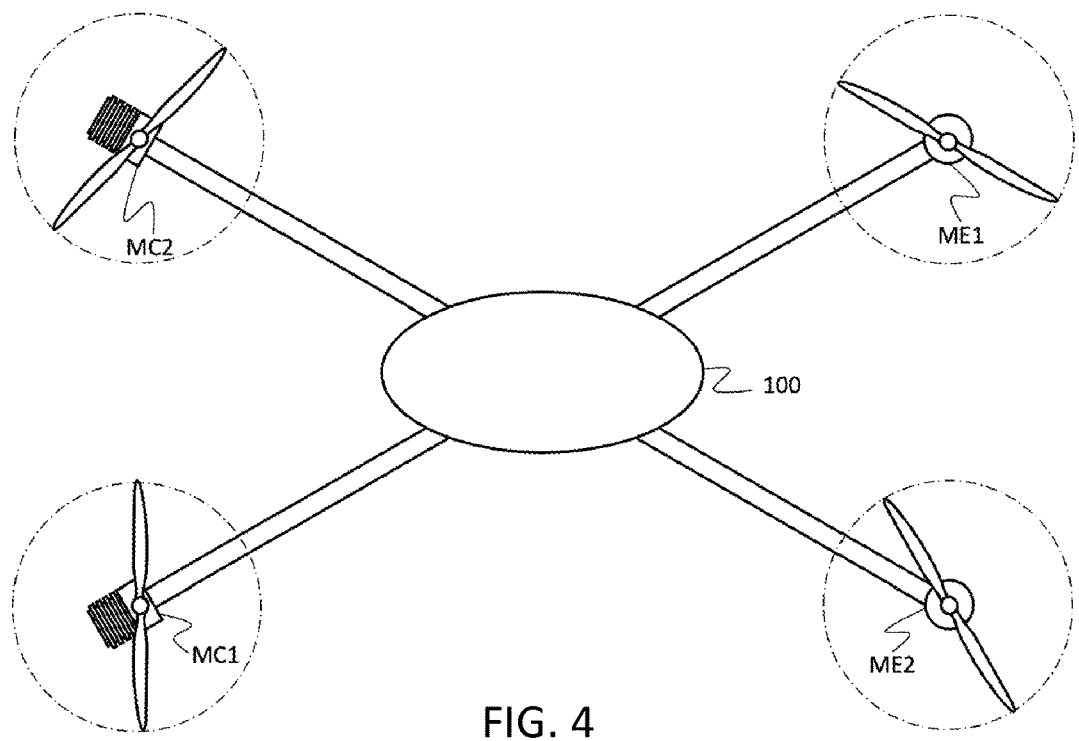
FIG. 4 shows a first embodiment variant of the flying device of FIG. 1.

FIG. 4 shows a view from above of a first variant of a flying device using two combustion engines MC1 and MC2 and two electric motors ME1 and ME2 arranged in a star shape around a central body 100. Each combustion engine MC1 or MC2 is placed on a side opposite an electric motor ME1 or ME2 with respect to the main body 100, the electric motors ME1 and ME2 being placed for example towards the front of the flying device and the combustion engines MC1 and MC2 being placed for example towards the back of the flying device. Moreover, each combustion engine MC1 or MC2 is coupled to an electric generator, which is connected to the electric motor ME1 or ME2 via a transfer circuit identical to one of the circuits described with the aid of FIG. 2 or FIG. 3.

In order to ensure a vertical thrust, the electric motors ME1 and ME2 and the heat engines MC1 and MC2 provide an identical thrust. In order to move forwards, the combustion engines MC1 and MC2 should be accelerated while the electric motors ME1 and ME2 are slowed down. For a movement in another direction, the flying device should be tilted in the desired direction by transferring more or less energy between the combustion engine MC1 and the electric motor ME1 or between the combustion engine MC2 and the electric motor ME2.

The flying device of FIG. 4, like the flying device of FIG. 1, requires a large energy transfer between the combustion engines MC1 and MC2 and the electric motors ME1 and ME2. The losses linked to the energy transfer are proportional to the amount of energy. In order to decrease the losses linked to the energy transfer, it is possible to use a larger number of combustion engines and electric motors.

Figure 5:
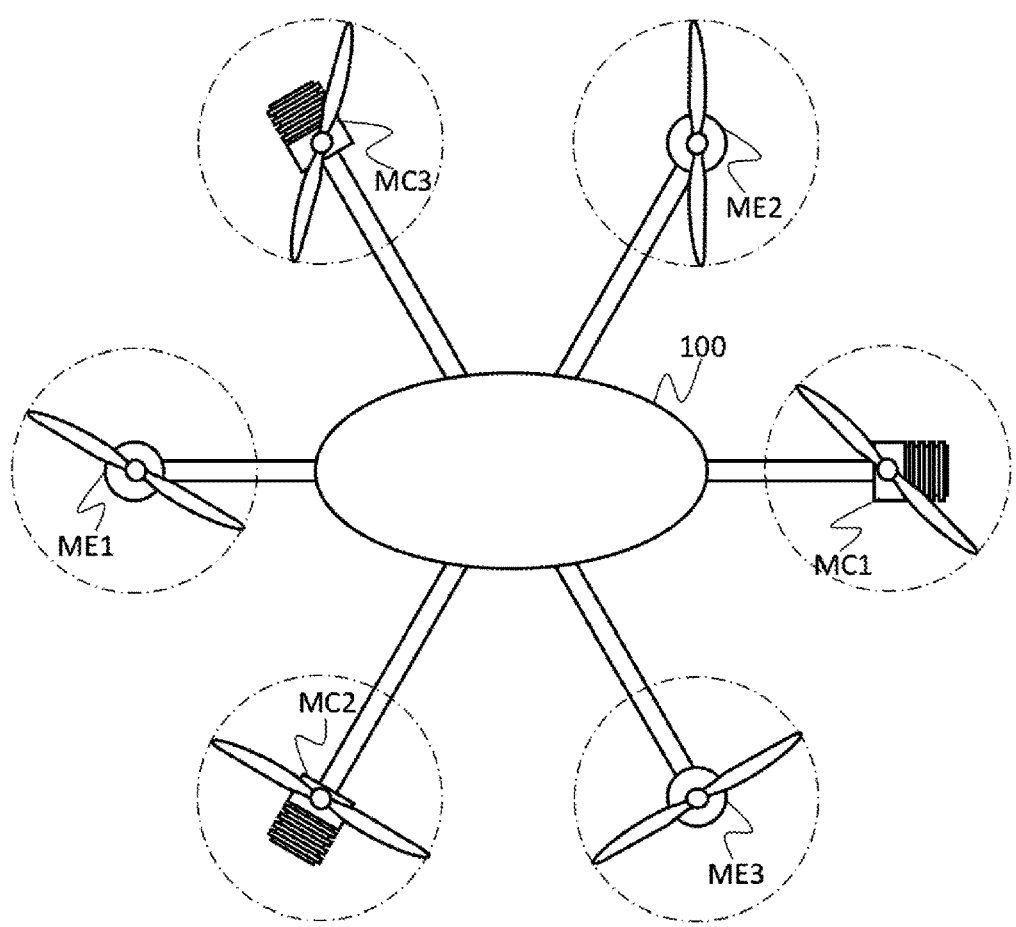
FIG. 5 shows a second embodiment variant of the flying device of FIG. 1.

FIG. 5 shows a view from above of a second variant of a flying device using three combustion engines MC1, MC2 and MC3 and three electric motors ME1, ME2 and ME3 arranged on vertices of a hexagon centred around a central body 100. The combustion engines MC1 to MC3 are placed in an alternating manner with respect to the electric motors ME1 to ME3 and each combustion engine MC1 to MC3 is connected via a generator and a transfer circuit to an electric motor ME1 to ME3 placed on an opposite side with respect to the main body 100. The principle of energy transfer between each combustion engine MC1 to MC3 and each electric motor ME1 to ME3 is similar to that described with the aid of FIG. 2 or FIG. 3. However, with such an arrangement of the combustion engines MC1 to MC3 and electric motors ME1 to ME3, the electric motors ME1 to ME3 are only used to ensure the tipping of the flying device, the hovering thrust being ensured solely by the combustion engines MC1 to MC3.

Figure 6:
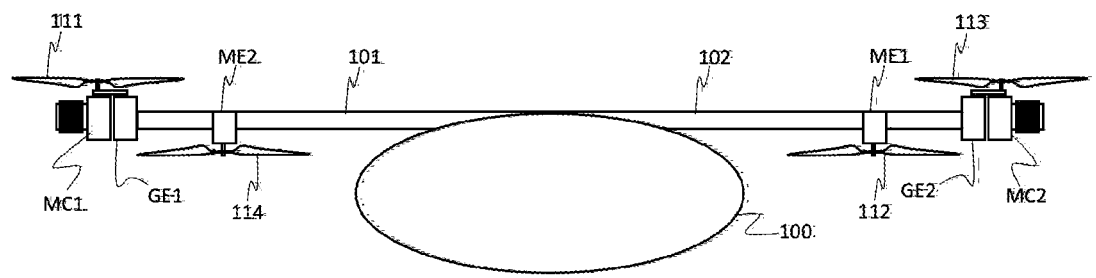
FIG. 6 shows a second example of a flying device according to the invention.

The flying device of FIG. 5 can in fact tilt in any direction whatever by slowing down one or two combustion engines MC1 and/or MC2 and/or MC3 while simultaneously starting and accelerating one or two electric motors ME1 and/or ME2 and/or ME3 located opposite the slowed-down combustion engine(s) MC1 and/or MC2 and/or MC3. The principle of energy transfer takes place in the same manner as has been described with the aid of FIG. 2 or FIG. 3, but the energy transferred is reduced because it only serves to tip the flying device and it is not necessary to transfer 50% of the energy of the combustion engines in order to ensure an equivalent thrust on an opposite side in order to have a balanced thrust. Using the principle of balancing the thrust forces between the combustion engines, FIG. 6 represents a second embodiment example of a flying device ensuring an attitude control according to a single axis of rotation, according to a side view. Such a flying device can have other motors/engines or balancing means in order to ensure a tipping according to another axis and to ensure an attitude control according to several axes of rotation. By way of example, such a device can be used for example on one of the flying devices disclosed in the patent application WO 2017/174942, but only for attitude control in one direction by placing the combustion engine and electric motor either on the left and right or at the front and back.

The flying device of FIG. 6 has a main body 100, on which a first combustion engine MC1, a second combustion engine MC2, a first electric motor ME1 and a second electric motor ME2 are fixed. The fixing of the combustion engines MC1 and MC2 and electric motors ME1 and ME2 can be carried out with the aid of fixing arms 101 and 102 placed on either side of the main body 100, the first combustion engine MC1 and the second electric motor ME2 being placed on one of the arms 101, the second combustion engine MC2 and the first electric motor ME1 being placed on the other arm 102. The invention is not limited to the use of arms and can use any other fixing means, it being important that the first combustion engine MC1 and electric motor ME1 are placed on either side of the main body 100 and that the second combustion engine MC2 and electric motor ME2 are also placed on either side of the main body, the second combustion engine MC2 being placed on the same side as the first electric motor ME1 and the second electric motor ME2 being placed on the same side as the first combustion engine MC1. Thus, the first and second combustion engines MC1 and MC2 create vertical thrust vectors on two opposite sides of the main body 100, as well as the first and second electric motors ME1 and ME2.

The first and second combustion engines MC1 and MC2 are preferably identical and mechanically connected to propellors 111 and 113 which convert the rotation of each engine into a thrust vector substantially vertical with respect to the main body 100. The first and second electric motors ME1 and ME2 are also connected to propellors 112 and 114 which convert the rotation of the electric motor ME into a vertical thrust vector. The first and second electric motors ME1 and ME2 are preferably identical but can have less power than the first and second combustion engines MC1 and MC2.

The flying device of FIG. 6 moreover has a first electric generator GE1 mechanically coupled to the first combustion engine MC1, and a second electric generator GE2 mechanically coupled to the second combustion engine MC2. The first and second electric generators GE1 and GE2 are electric motors the power of which is of the same order of magnitude as the first and second electric motors ME1 and ME2.

A first electrical energy transfer circuit is connected between the first electric generator GE1 and the first electric motor ME1. A second electrical energy transfer circuit is connected between the second electric generator GE2 and the second electric motor ME2. The first and second energy transfer circuits are identical and can correspond to the previously described transfer circuit 200 or transfer circuit 300. However, the use of two combustion engines coupled to two electric motors placed facing on either side of the main body 100 makes a shared management of the motors/engines possible, which makes a coupling between the first and second energy transfer circuits possible.

Figure 7:
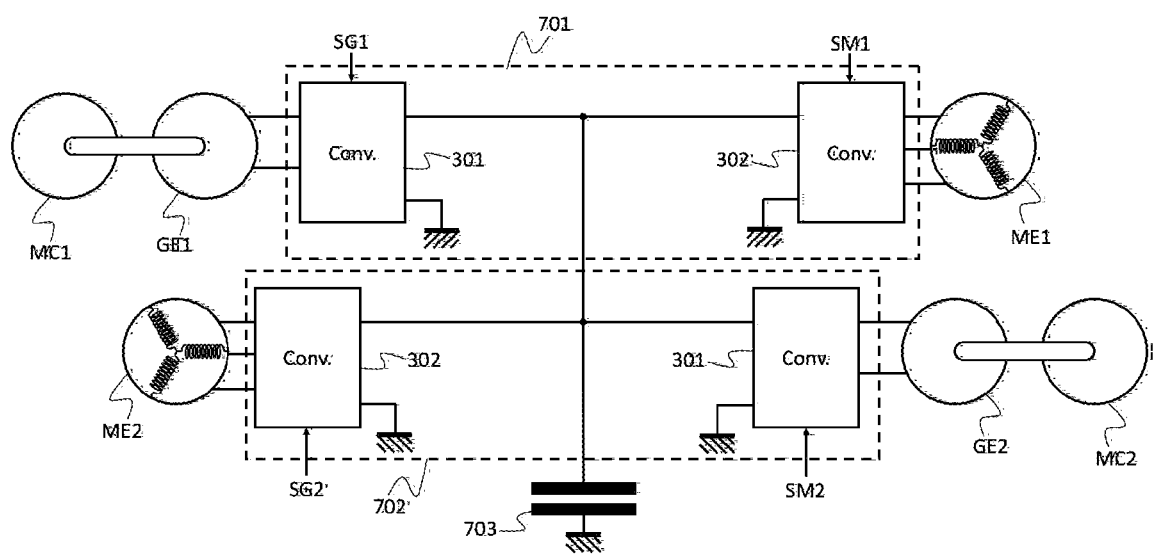
FIG. 7 illustrates a first example of an electric circuit implemented in the flying device of FIG. 6.

FIG. 7 illustrates a first example of a shared electric circuit which is derived from the electric circuit of FIG. 3 in order to implement it in the flying device of FIG. 6.

The electric circuit of FIG. 7 has a first transfer circuit 701, a second transfer circuit 702 and a storage element 703. The first transfer circuit 701 is connected between the first electric generator GE1 and the first electric motor ME1. The second transfer circuit 702 is connected between the second electric generator GE2 and the second electric motor ME2. The first and second transfer circuits 701 and 702 are identical and each have a first energy converter 301 and a second energy converter 302. The first and second energy converters 301 and 302 are of the same nature as those described jointly with FIG. 3.

The first energy converter 301 of the first transfer circuit 701 has signal inputs connected to the first electric generator GE1, a current output and a control signal input receiving a control signal SG1. The first energy converter 301 of the second transfer circuit 702 has signal inputs connected to the second electric generator GE2, a current output and a control signal input receiving a control signal SG2. The second energy converter 302 of the first transfer circuit 701 has signal outputs connected to the first electric motor ME1, a current input and a control signal input SM1. The second energy converter 302 of the second transfer circuit 702 has signal outputs connected to the second electric motor ME2, a current input and a control signal input SM2. The current outputs of the first converters 301 are connected together to the current inputs of the second converters 302 and to a first terminal of the storage element 703. A second terminal of the storage element 703 is connected to earth, the storage element 703 being for example a capacitor.

In terms of operation, the first and second transfer circuits 701 and 702 do not operate simultaneously. When the flying device is hovering, the first and second combustion engines MC1 and MC2 provide identical thrust forces and the first and second electric motors ME1 and ME2 are not powered. The control signals SG1, SG2, SM1 and SM2 send a command, which is for example to open the circuit of the first and second generators GE1 and GE2 and of the electric motors ME1 and ME2. To tilt the flying device to one side, an electric motor should be started up, for example the first electric motor ME1, and the combustion engine located on the opposite side should be braked, for example the first combustion engine MC1, in order to create a thrust imbalance which will tilt the flying device. To this end, the signal SG1 controls the first converter 301 of the first transfer circuit 701 in order that it applies a load impedance to the first generator GE1 corresponding to a braking of the first combustion engine MC1. The energy provided for the impedance is converted into current, which charges the storage element 703. With a slight gap making it possible to charge the storage element 703, the signal SM1 controls the second converter 302 of the first transfer circuit 701 in order that the first electric motor ME1 starts up and accelerates up to a speed making it possible to obtain the required tilt. In order to return to a balanced position, the control signals SG1 and SM1 re-open the circuit of the first generator GE1 and the first electric motor ME1. In order to return more quickly to a balanced position, it is possible to activate the second electric motor ME2 by sending a command SM2 using a residual energy contained in the storage element 703, which makes it possible to compensate for a slow acceleration of the first combustion engine MC1.

As the first and second generators GE1 and GE2 are electric motors, they can also be used as a motor and can be used as starters for the combustion engines MC1 and MC2 as long as reversible, i.e. bidirectional, first converters 301 are used. To this end, the storage element 703 can be a battery such as for example a lead-acid battery. In order to limit the weight and size of the battery, it is preferable to use a battery with high charge density, such as for example a lithium battery. However, the circuit of FIG. 7 does not make it possible to use a battery which requires a controlled charge.

Figure 8:
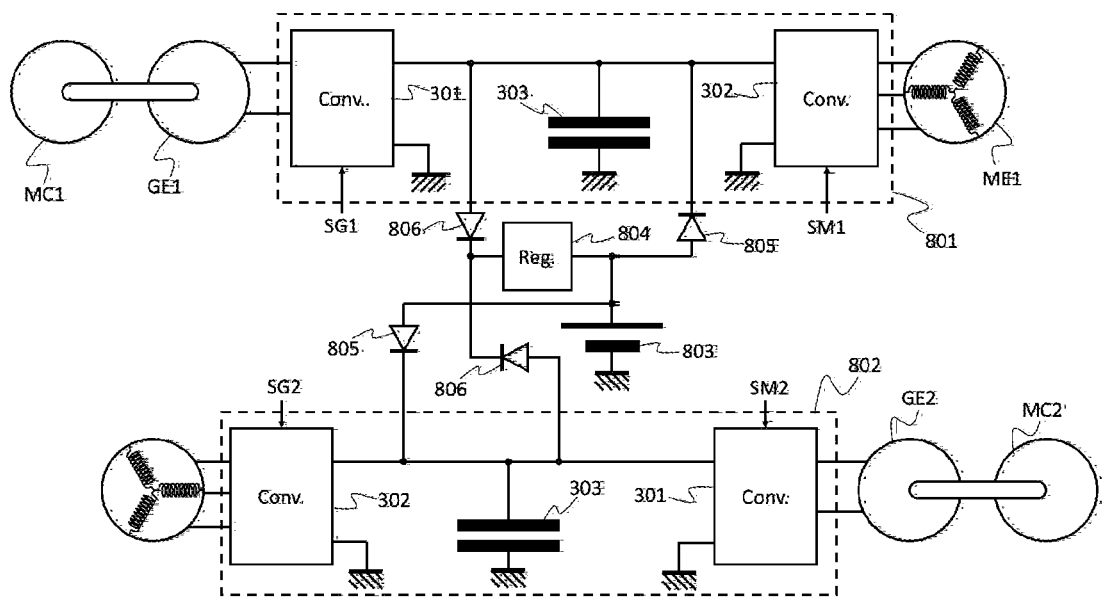
FIG. 8 illustrates a second example of an electric circuit implemented in the flying device of FIG. 6.

FIG. 8 illustrates a second example of a shared electric circuit which is also derived from the electric circuit of FIG. 3.

The electric circuit of FIG. 8 has a first transfer circuit 801, a second transfer circuit 802, a battery 803 and a charge-regulating circuit 804. The first transfer circuit 801 is connected between the first electric generator GE1 and the first electric motor ME1. The second transfer circuit 802 is connected between the second electric generator GE2 and the second electric motor ME2. The first and second transfer circuits 801 and 802 are identical to the transfer circuit 300 described jointly with FIG. 3 and each have a first energy converter 301, a second energy converter 302 and a storage element 303.

The first energy converter 301 of the first transfer circuit 801 has signal inputs connected to the first electric generator GE1, a current output and a control signal input receiving a control signal SG1. The first energy converter 301 of the second transfer circuit 802 has signal inputs connected to the second electric generator GE2, a current output and a control signal input receiving a control signal SG2. The second energy converter 302 of the first transfer circuit 801 has signal outputs connected to the first electric motor ME1, a current input and a control signal input SM1. The second energy converter 302 of the second transfer circuit 802 has signal outputs connected to the second electric motor ME2, a current input and a control signal input SM2. For each of the first and second transfer circuits 801 and 802, the current output of the first converter 301 is connected to the current input of the second converter 302 and to a first terminal of the storage element 303. A second terminal of the storage element 303 is connected to earth, the storage element 303 being for example a capacitor.

The battery 803 is a battery with high charge density, such as for example a lithium battery or a nickel battery. The battery 803 has a first terminal connected to earth and a second terminal connected to the first terminal of the storage element 303 of each of the transfer circuits 801 and 802 via first diodes 805. The charge-regulating circuit 804 is a voltage and current regulator adapted to the battery 803 in order to be able to charge the latter with a charging voltage and current adapted to its level of charge according to a known regulation technique. The charge-regulating circuit 804 has a voltage output connected to the second terminal of the battery 803 and a voltage input connected to the first terminal of the storage element 303 of each of the transfer circuits 801 and 802 via second diodes 806. The first diodes 805 allow current to pass only from the battery 803 to the storage elements 303. The second diodes 806 allow current to pass only from the storage elements 303 to the voltage input of the charge-regulating circuit 804.

The operation of the electric circuit of FIG. 8 is similar to that of FIG. 7 in respect of a hovering or a tilting of the flying device. However, each transfer circuit 801 and 802 has its own storage element 303. The difference is in the management of the energy of the storage devices 303 and the battery 803. If the voltage at the terminals of a storage device 303 is lower than the battery voltage less the switching voltage of a first diode 805, then the battery 803 charges said storage device 303.

Thus, each storage device 303 always has a minimum residual charge and can always return energy to an electric motor ME1 or ME2 if it is necessary to accelerate said electric motor ME1 or ME2 without receiving a sufficient energy from the combustion engine MC1 or MC2. During a tipping, the storage device 303 can nevertheless be charged during the braking of a combustion engine MC1 or MC2. If several successive tips are carried out on the same side without reverse tipping, a storage element 303 will see its charge continually increase. When the level of charge of a storage element 303 reaches a predetermined charge threshold, the excess charge can recharge the battery 803. The predetermined charge threshold can be defined as being equal to a minimum input voltage of the regulating circuit 804 plus the switching voltage of the second diodes 806.

When the regulating circuit 804 has an input voltage higher than the minimum voltage, the regulating circuit provides a regulated charging voltage which recharges the battery 803.

Figure 9:
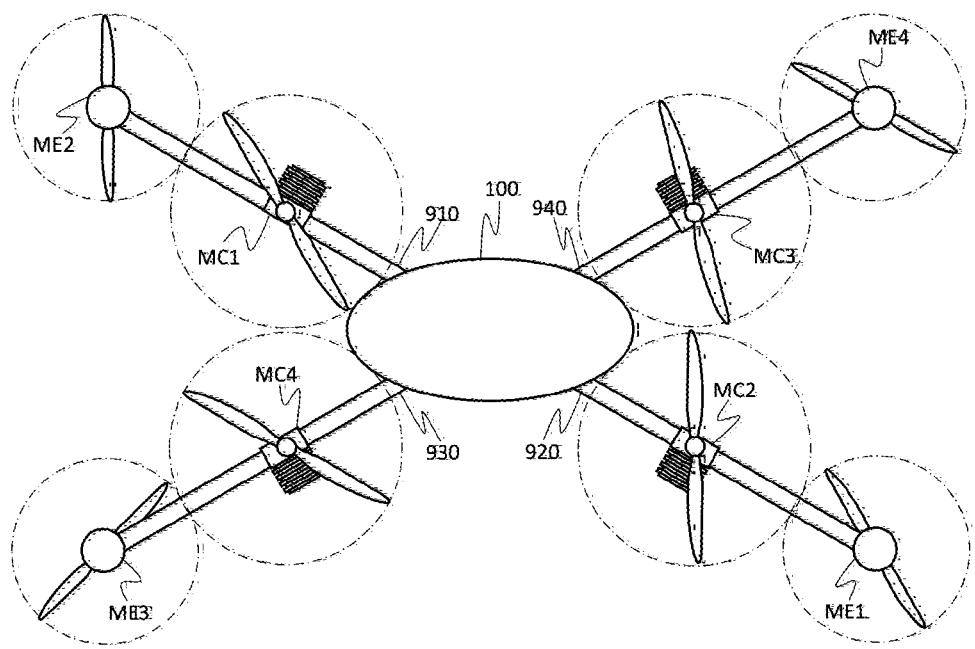
FIG. 9 shows an embodiment variant of the flying device of FIG. 6.

FIG. 9 shows a view from above of a variant of the flying device from FIG. 6 which has an attitude control according to several axes of rotation.

FIG. 9 shows a first variant of a flying device using first to fourth combustion engines MC1, MC2, MC3 and MC4 and first to fourth electric motors ME1, ME2, ME3 and ME4 arranged in a star shape around a central body 100. The first to fourth combustion engines MC1, MC2, MC3 and MC4 are respectively placed on a side opposite the first to fourth electric motors ME1, ME2, ME3 and ME4 with respect to the main body 100 of the flying device in order to create vertical thrust vectors on two opposite sides of said body 100. The first combustion engine MC1 is placed on the same side as the second electric motor ME2 on a first support arm 910. The first electric motor ME1 is placed on the same side as the second combustion engine MC2 on a second support arm 920. The fourth combustion engine MC4 is placed on the same side as the third electric motor ME3 on a third support arm 930. The fourth electric motor ME4 is placed on the same side as the third combustion engine MC3 on a fourth support arm 940. The first and second combustion engines MC1 and MC2 and electric motors ME1 and ME2 are aligned such that their thrust vectors are inscribed in a first thrust plane. The third and fourth combustion engines MC3 and MC4 and electric motors ME3 and ME4 are aligned such that their thrust vectors are inscribed in a second thrust plane, the first thrust plane intersecting the second thrust plane on a vertical axis corresponding to the intersection of the arms 910 to 940.

In this variant, the vertical axis corresponding to the intersection of the arms 910 to 940 passes through the centre of gravity of the flying device in order to guarantee more stability while hovering, and therefore less attitude compensation. If it is desired to use less energy to ensure an attitude tilted in a preferred direction, it is possible to move the vertical axis in an opposite direction with respect to the centre of gravity.

The first to fourth electric motors ME1 to ME4 can also be positioned at a greater distance from the centre of gravity of the main body 100 than the first to fourth combustion engines MC1 to MC4. Such a configuration makes it possible to increase the moment of force of the thrust vectors of the electric motors ME1 to ME4 with respect to the moment of force of the thrust vectors of the combustion engines MC1 to MC4. Thus, the thrust force of the electric motors ME1 to ME4 will be amplified in the attitude tipping torque of the flying device.

The flying device of FIG. 9 moreover has first to fourth electric generators GE1, GE2, GE3 and GE4 coupled respectively to the first to fourth combustion engines MC1, MC2, MC3 and MC4. The first to fourth electric generators GE1 to GE4 are electric motors the power of which is of the same order of magnitude as the first to fourth electric motors ME1 to ME4. First to fourth electrical energy transfer circuits are connected respectively between the first to fourth electric generators GE1 to GE4 and the first to fourth electric motors ME1 to ME4. The first to fourth energy transfer circuits are identical and can correspond to the previously described transfer circuits 200, 300, 701, 702, 801 or 802.

Figure 10:
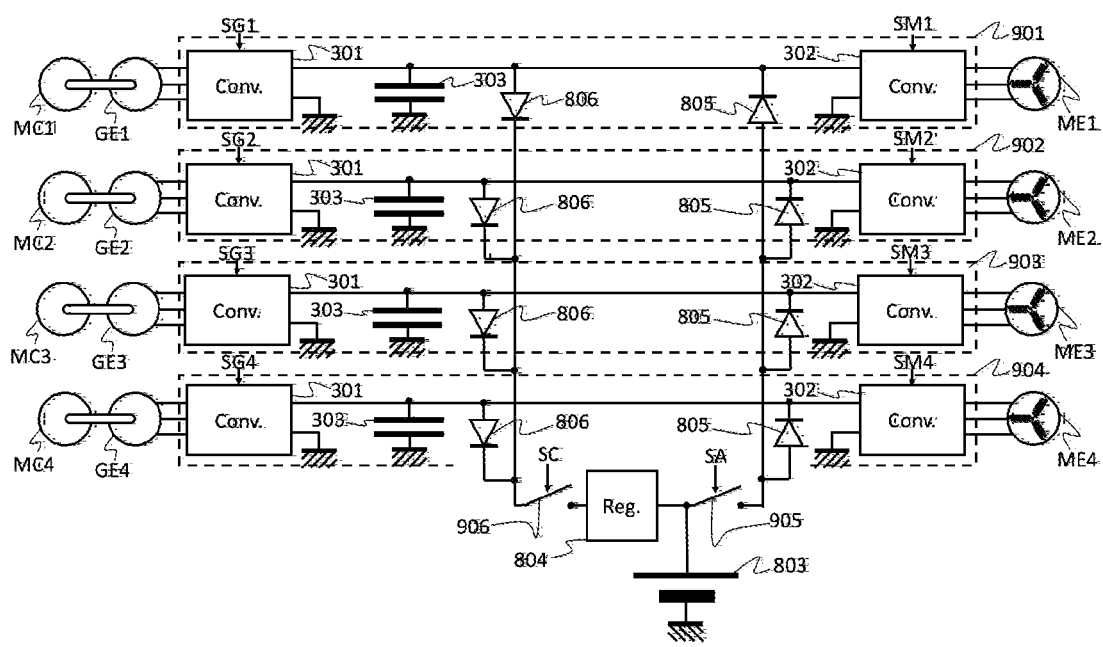
FIG. 10 illustrates an example of an electric circuit implemented in the flying device of FIG. 10.

By way of example, FIG. 10 shows an example of an electric circuit used by the flying device of FIG. 9 adapted from the circuit of FIG. 8.

The electric circuit of FIG. 10 has first to fourth transfer circuits 901, 902, 903 and 904, a battery 803 and a charge-regulating circuit 804. The first to fourth energy transfer circuits 901 to 904 are connected respectively between the first to fourth electric generators GE1 to GE4 and the first to fourth electric motors ME1 to ME4. The first to fourth transfer circuits 901 to 904 are identical to the transfer circuits 801 and 802 described jointly with FIG. 8 and do not need to be described in more detail.

The battery 803 has a first terminal connected to earth and a second terminal connected to the first terminal of the storage element 303 of each of the transfer circuits 901 to 904 via first diodes 805 and a first switch 905. The charge-regulating circuit 804 is a voltage and current regulator adapted to the battery 803. The charge-regulating circuit 804 has a voltage output connected to the second terminal of the battery 803 and a voltage input connected to the first terminal of the storage element 303 of each of the transfer circuits 801 and 802 via second diodes 806 and a switch 906. The first diodes 805 allow current to pass only from the battery 803 to the storage elements 303. The second diodes 806 allow current to pass only from the storage elements 303 to the voltage input of the charge-regulating circuit 804.

The operation of the electric circuit of FIG. 10 mainly differs from that of FIG. 8 through the addition of the first and second switches 905 and 906, which serve to reduce the stress on the battery in order to increase its lifetime. The first switch 905 serves to prevent a systematic recharging of the storage elements 303 as soon as the voltage at the terminals of a storage element 303 is lower than the voltage at the terminals of the battery. The first switch 905 is designed to remain open except for starting up the combustion engines MC1 to MC4 or when a storage element 303 has a level of charge which does not make it possible to be able to power an electric motor ME1 to ME2. The second switch 906 serves to also prevent a systematic recharging of the battery 803 as soon as a level of charge of a storage element 303 allows it. Closure of the second switch 906 can occur when a storage element 303 reaches a maximum level of charge which is in danger of damaging the electric circuit, the second switch 906 remaining closed until the storage element 303 reaches a much lower level of charge, for example half of the maximum level of charge. The second switch 906 can also close when the battery 803 is at too low a level of charge, the second switch 906 then remaining closed until the battery 803 reaches a level of charge close to its maximum charge without reaching it in order to allow it to recharge if storage elements 303 are in overload.

Figure 11:
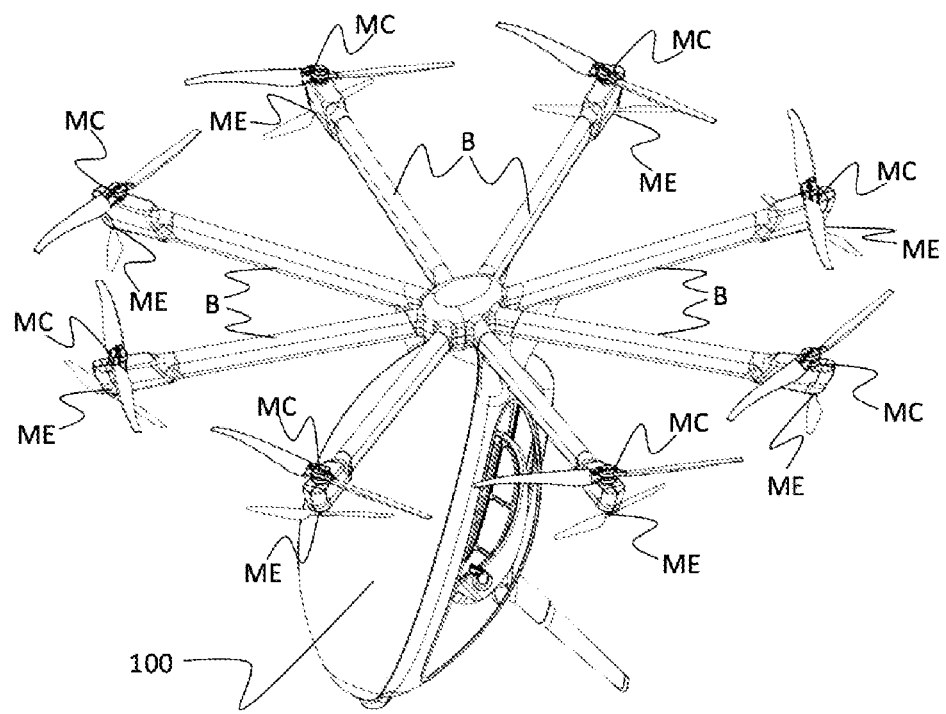
FIG. 11 shows an embodiment variant of the flying device of FIG. 9 for transporting people.

Numerous variants of the invention are possible, the number of motors/engines being able to be greater for example. By way of example, FIG. 11 represents, in perspective, a flying device dedicated to transporting people, which has eight arms B each supporting a combustion engine MC and an electric motor ME. The eight arms B are arranged in a star shape and intersect at the level of a central point equidistant from each combustion engine MC and from each electric motor ME. Each electric motor ME is supplied with energy by the combustion engine MC located on the opposite arm via a transfer circuit housed inside said arms B. The eight arms B are fixed at the level of their central point on the top of a main body 100. The main body 100 is constituted by a cabin intended to receive a passenger.

Numerous other variants of the invention are possible without departing from the scope of the invention as defined in the claims. By way of example, the main body is not limited to a passenger cabin and could be a platform or a compartment intended to receive goods. The combustion engines and electric motors can be placed on each side of the compartment or platform. The number of electric motors can be different from the number of combustion engines, a combustion engine being able to power two electric motors for example. The fixing arms are not necessary if the combustion engines and/or electric motors form an integral part of the body of the flying device or are integrated in a fairing of the body of the flying device.

The combustion engines can be any type of engine using a solid, liquid or gaseous fuel. By way of example, a turbojet can be used, by recovering the mechanical energy on its central rotor.

In the different examples represented, the combustion engines are represented on either side of a main body and could suggest to a person skilled in the art that on each side means diametrically opposite one another facing a centre of gravity. It is not necessary that the arrangement of the motors/engines is symmetrical with respect to a centre of gravity or an axis of symmetry or a plane of symmetry. Whatever the exact position of the motors/engines, an action on the combustion engines and electric motors opposite one another, the flying device carries out an attitude tipping, for this it is sufficient that the motors/engines are placed on each side of any plane passing through the centre of gravity of the flying device, separating the latter into two parts which are not necessarily symmetrical and said plane being aligned on the thrust direction of the thrust vectors of the motors/engines, in other words substantially parallel to said thrust direction. The use of a plane, axis or centre of symmetry passing through the centre of gravity to arrange the motors/engines only makes it possible to establish commands more easily because the axis of rotation is easier to calculate.

As indicated previously for reasons of simplicity, the present description refers to combustion engines and electric motors producing thrust vectors in one and the same vertical thrust direction. The thrust vectors can be directed into another thrust direction which is not necessarily vertical. In this case, for combustion engines and electric motors with thrust forces which are adjusted by energy transfer, said engines and motors should be arranged such that their thrust vectors are aligned in one and the same thrust direction, the alignment of the thrust vectors being able to be effected with a tolerance of a few degrees.

The invention claimed is:

1. Flying device having a main body on which a first combustion engine and a first electric motor are fixed, said first combustion engine and electric motor being arranged to create thrust vectors in one and the same thrust direction and being placed on either side of the main body in order to create thrust vectors on each side of a separation plane passing through a centre of gravity of said body so as to control the attitude of the flying device, characterized in that it has:
   a first electric generator mechanically coupled to the first combustion engine in order to be driven by the latter; and
   a first electrical energy transfer circuit connected between the first electric generator and the first electric motor, the first energy transfer circuit being configured to create a mechanical resistance that slows down the first combustion engine and to produce electrical energy in order to power the first electric motor,
   wherein the first transfer circuit has a first energy converter controlled to apply a load impedance to the first generator and to provide the energy recovered by the load impedance on an output to the first electric motor, and
   wherein the first transfer circuit has a second energy converter having an energy input connected to the energy output of the first energy converter and to the first electric motor, said second converter converting the energy received at its input into control signals of the first electric motor.

2. Flying device according to claim 1, in which the first transfer circuit has an electrical energy storage element, connected between the energy output of the first energy converter and earth in order to absorb a surplus of energy not used by the second energy converter and to return this energy if the energy provided by said first converter is not sufficient to power said second converter.

3. Flying device according to claim 2, in which the storage elements are high-capacity capacitors.

4. Flying device according to claim 3, which has a rechargeable battery connected in parallel to the storage elements of the first and second transfer circuits to recover an excess charge of said storage elements.

5. Flying device according to claim 4, in which the first energy converters are bidirectional and can power the first and second generators in order to act as starters for the first and second combustion engines and in which the battery powers said generators in order to start said first and second engines.

6. Flying device according to claim 1, which has:
- a second combustion engine and a second electric motor, said second combustion engine and electric motor creating thrust vectors in the thrust direction and being fixed on either side of the main body in order to create thrust vectors on each side of the separation plane passing through the centre of gravity of said body, the second combustion engine being placed on the same side of the separation plane as the first electric motor and the second electric motor being placed on the same side of the separation plane as the first combustion engine;
- a second electric generator mechanically coupled to the second combustion engine in order to be driven by the latter; and
- a second electrical energy transfer circuit connected between the second electric generator and the second electric motor, said second transfer circuit being constituted identically to the first transfer circuit.

7. Flying device according to claim 6, in which the thrust vectors of the first and second combustion engines and electric motors are comprised in a first thrust plane, in which the flying device moreover has:
- a third combustion engine and a third electric motor, said third combustion engine and electric motor creating thrust vectors in the thrust direction and being fixed on either side of the main body in order to create thrust vectors on each side of the separation plane passing through the centre of gravity of said body,
- a fourth combustion engine and a fourth electric motor, said fourth combustion engine and electric motor creating thrust vectors in the thrust direction and being fixed on either side of the main body in order to create thrust vectors on each side of the separation plane passing through the centre of gravity of said body, the fourth combustion engine being placed on the same side of the separation plane as the third electric motor and the fourth electric motor being placed on the same side of the separation plane as the third combustion engine;
- third and fourth electric generators mechanically coupled respectively to the third and fourth combustion engines in order to be driven by these latter; and
- third and fourth electrical energy transfer circuits connected respectively between the third and fourth electric generators and the third and fourth electric motors, said third and fourth transfer circuits being constituted identically to the first transfer circuit;
- and in which the thrust vectors of the third and fourth combustion engines and electric motors are comprised in a second thrust plane intersecting the first thrust plane on a crossing axis parallel to the thrust direction.

8. Flying device according to claim 7, in which the crossing axis passes through the centre of gravity of the flying device.

9. Flying device according to claim 7, in which the first to fourth combustion engines and electric motors are fixed to the main body via four support arms positioned above the centre of gravity of said body and arranged to support the first to fourth combustion engines and electric motors, and integrate the electrical energy storage elements.

10. Flying device according to claim 1, in which the first and/or second electric motors are positioned respectively at greater distances from the centre of gravity of the main body of said device than the first and/or second combustion engines.

11. Flying device according to claim 1, in which the thrust direction is vertical.

* * * * *